US012665132B2

(12) United States Patent
Lee et al.

(10) Patent No.: US 12,665,132 B2
(45) Date of Patent: Jun. 23, 2026

(54) MULTILAYER CERAMIC CAPACITOR AND METHOD OF MANUFACTURING THE SAME

(71) Applicant: SAMSUNG ELECTRO-MECHANICS CO., LTD., Suwon-si (KR)

(72) Inventors: Hyoju Lee, Suwon-si (KR); Sanghyun Lee, Suwon-si (KR); Tae Hyung Kim, Suwon-si (KR); Nam Woon Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 196 days.

(21) Appl. No.: 18/770,775

(22) Filed: Jul. 12, 2024

(65) Prior Publication Data

US 2025/0182969 A1      Jun. 5, 2025

(30) Foreign Application Priority Data

Dec. 1, 2023      (KR) ........................ 10-2023-0172488
Mar. 4, 2024      (KR) ........................ 10-2024-0030664

(51) Int. Cl.
*H01G 4/12*          (2006.01)
*C04B 35/468*      (2006.01)
(Continued)

(52) U.S. Cl.
CPC ....... *H01G 4/1227* (2013.01); *C04B 35/4682* (2013.01); *C04B 35/62821* (2013.01);
(Continued)

(58) Field of Classification Search
CPC ...... H01G 4/1227; H01G 4/30; H01G 4/1218; H01G 4/1209; C04B 35/4682;
(Continued)

(56) References Cited

U.S. PATENT DOCUMENTS 11,276,527 B2 *   3/2022   Araki ..................... H01G 4/012
12,412,704 B2 *   9/2025   Yun ........................ H01G 4/232
(Continued)

FOREIGN PATENT DOCUMENTS

KR      10-2018-0051760 A      5/2018
KR      10-2022-0156269 A      11/2022
(Continued)

*Primary Examiner* — Dion R. Ferguson
(74) *Attorney, Agent, or Firm* — Morgan, Lewis & Bockius LLP

(57)          ABSTRACT

Provided are a multilayer ceramic capacitor and a method of manufacturing the same, the multilayer ceramic capacitor including a capacitor body including a dielectric layer and an internal electrode layer, and an external electrode disposed on an outer surface the capacitor body, wherein the dielectric layer includes a plurality of dielectric grains, at least one of the plurality of dielectric grains includes a dielectric composite in which a barium titanate-based compound is doped with hafnium (Hf) or a first transition metal; and a subcomponent including a rare earth element, a second transition metal, or a combination thereof.

24 Claims, 10 Drawing Sheets

10

(51) Int. Cl.

| | |
|---|---|
| *C04B 35/628* | (2006.01) |
| *C04B 35/64* | (2006.01) |
| *C04B 37/00* | (2006.01) |
| *C04B 41/00* | (2006.01) |
| *C04B 41/45* | (2006.01) |
| *C04B 41/51* | (2006.01) |
| *C04B 41/88* | (2006.01) |
| *H01G 4/30* | (2006.01) |

(52) U.S. Cl.

CPC ............ *C04B 35/64* (2013.01); *C04B 37/001* (2013.01); *C04B 41/0072* (2013.01); *C04B 41/4578* (2013.01); *C04B 41/5144* (2013.01); *C04B 41/88* (2013.01); *H01G 4/30* (2013.01); *C04B 2235/3224* (2013.01); *C04B 2235/3236* (2013.01); *C04B 2235/3239* (2013.01); *C04B 2235/3244* (2013.01); *C04B 2235/3262* (2013.01); *C04B 2235/781* (2013.01); *C04B 2235/785* (2013.01); *C04B 2235/85* (2013.01); *C04B 2237/346* (2013.01); *C04B 2237/68* (2013.01)

(58) Field of Classification Search

CPC . C04B 35/62821; C04B 35/64; C04B 37/001; C04B 41/0072; C04B 41/4578; C04B 41/5144; C04B 41/88; C04B 2235/3224; C04B 2235/3236; C04B 2235/3239; C04B 2235/3244; C04B 2235/3262; C04B 2235/781; C04B 2235/785; C04B 2235/85; C04B 2237/346; C04B 2237/68; C04B 2111/00844; C04B 35/62815; C04B 35/62818; C04B 35/62823; C04B 35/62894; C04B 35/62897; C04B 41/009; C04B 41/5194; C04B 2235/3225; C04B 2235/3227; C04B 2235/3229; C04B 2235/3251

See application file for complete search history.

(56) References Cited

U.S. PATENT DOCUMENTS

| | | | | |
|---|---|---|---|---|
| 2018/0130601 A1* | 5/2018 | Kim | ......................... | H01G 4/33 |
| 2022/0375688 A1* | 11/2022 | Yoon | .................... | H01G 4/1227 |
| 2024/0222033 A1* | 7/2024 | Lee | ......................... | H01G 4/008 |
| 2025/0182969 A1* | 6/2025 | Lee | ..................... | C04B 35/4682 |

FOREIGN PATENT DOCUMENTS

| | | | | |
|---|---|---|---|---|
| KR | 20240108780 A | * 7/2024 | ............. | H01G 4/232 |
| WO | WO-2014069268 A1 | * 5/2014 | .............. | F16C 33/32 |

* cited by examiner

MULTILAYER CERAMIC CAPACITOR AND METHOD OF MANUFACTURING THE SAME

CROSS-REFERENCE TO RELATED APPLICATION

This application claims priority to and the benefit of Korean Patent Application No. 10-2024-0030664 filed in the Korean Intellectual Property Office on Mar. 4, 2024, and Korean Patent Application No. 10-2023-0172488 filed in the Korean Intellectual Property Office on Dec. 1, 2023, the entire contents of which are incorporated herein by reference.

BACKGROUND

The present disclosure relates to a multilayer ceramic capacitor and a manufacturing method thereof.

As electronic components using a ceramic material, there are a capacitor, an inductor, a piezoelectric element, a varistor, a thermistor, and the like. Among ceramic electronic components, a multilayer ceramic capacitor (MLCC) may be used in various electronic devices due to advantages such as a small size, a high capacitance, an easy mounting feature, and the like.

For example, a multilayer ceramic capacitor (MLCC) may be used in a chip type condenser mounted on a board of several electronic products such as image devices, for example, liquid crystal displays (LCD), plasma display panels (PDP), or the like, computers, personal portable terminals, smartphones, and the like, to serve to charge or discharge electricity therein or therefrom.

$BaTiO_3$ dielectric is mainly used as a material for MLCC. $BaTiO_3$ dielectric is capable of realizing high capacity, but the capacity, or effective capacity, decreases under DC bias application conditions that correspond to the actual use conditions of the product. Recently, there is a growing trend in the industry to place emphasis on the effective capacity under actual product use conditions rather than the capacitance.

SUMMARY

An embodiment provides an excellent multilayer ceramic capacitor with improved DC-bias characteristics and reliability.

Another embodiment provides a method of manufacturing the multilayer ceramic capacitor.

An embodiment provides a multilayer ceramic capacitor including a capacitor body including a dielectric layer and an internal electrode layer, and an external electrode disposed on an outer surface the capacitor body, wherein the dielectric layer includes a plurality of dielectric grains, at least one of the plurality of dielectric grains includes a dielectric composite in which a barium titanate-based compound is doped with hafnium (Hf) or a first transition metal; and a subcomponent including a rare earth element, a second transition metal, or a combination thereof, among results from the TEM-EDS (transmission electron microscopy-energy dispersive spectroscopy) line analysis of the dielectric grains from a center of the dielectric grains to either grain boundary, a first point having a maximum atomic percent (atomic %) value of hafnium (Hf) or the first transition metal is different from a location of a second point having a maximum atomic % value of the rare earth element or the second transition metal, the first transition metal excludes hafnium (Hf), and the first transition metal and the second transition metal are different from each other.

Among results from the TEM-EDS (transmission electron microscopy-energy dispersive spectroscopy) line analysis of the dielectric grains from a center of the dielectric grains to either grain boundary, the second point having a maximum atomic % value of the rare earth element or the second transition metal may be located further outside from a center of the dielectric grain than the first point having a maximum atomic % value of the hafnium (Hf) or the first transition metal.

At least one of the plurality of dielectric grains has a core-double shell structure including: a core; a first shell surrounding at least a portion of the core; and a second shell surrounding at least a portion of the first shell.

The first shell may include the dielectric composite in which the barium titanate-based compound is doped with hafnium (Hf) or the first transition metal, and the second shell may include the subcomponent including the rare earth element, the second transition metal, or a combination thereof.

Among results from the TEM-EDS (transmission electron microscopy-energy dispersive spectroscopy) line analysis of the dielectric grains from a center of the dielectric grains to either grain boundary, the first shell may be a region including a peak with the maximum atomic % value of hafnium (Hf) or the first transition metal, the second shell may be a region including a peak with the maximum atomic % value of the rare earth element or the second transition metal, and the first shell and the second shell may have regions different from each other.

An atomic % content of hafnium (Hf) or the first transition metal in the first shell may be greater than an atomic % content of the rare earth element or the second transition metal, and an atomic % content of hafnium (Hf) or the first transition metal in the second shell may be smaller than an atomic % content of the rare earth element or the second transition metal.

The first transition metal may include zirconium (Zr), yttrium (Y), tantalum (Ta), niobium (Nb), or a combination thereof.

The rare earth element may include at least one selected from the group consisting of dysprosium (Dy), terbium (Tb), yttrium (Y), lanthanum (La), cerium (Ce), samarium (Sm), gadolinium (Gd), holmium (Ho), erbium (Er), and a combination thereof.

The second transition metal may include at least one selected from the group consisting of manganese (Mn), vanadium (V) and a combination thereof.

The hafnium (Hf) or the first transition metal may be doped in an amount of about 0.1 atomic % to about 5 atomic % based on a total amount of the dielectric composite.

The subcomponent may be included in an amount of about 0.1 atomic % to about 2 atomic % based on a total amount of components of the second shell.

A length of the core, which is measured from a major axis passing through the center of the dielectric grain, may be about 50 nm to about 150 nm.

An average length of the first shell, which is measured from a major axis passing through the center of the dielectric grain, may be about 10 nm to about 50 nm.

An average length of the second shell, which is measured from a major axis passing through the center of the dielectric grain may be about 40 nm to about 240 nm.

The dielectric grains may have an average diameter of greater than or equal to about 100 nm and less than about 266 nm.

A ratio of the number of dielectric grains having the core-double shell structure among the plurality of dielectric grains may be greater than or equal to about 50% and less than or equal to about 100%.

Another embodiment provides a method of manufacturing a multilayer ceramic capacitor which includes preparing a dielectric composite in which a barium titanate-based compound is doped with hafnium (Hf) or a first transition metal powder; manufacturing a dielectric green sheet using a dielectric slurry including the dielectric composite powder and a subcomponent powder, and forming a conductive paste layer on the surface of the dielectric green sheet; manufacturing a dielectric green sheet stack by stacking the dielectric green sheets on which the conductive paste layer is formed; manufacturing a capacitor body including a dielectric layer and an internal electrode layer by firing the dielectric green sheet stack; and forming an external electrode on one surface of the capacitor body, wherein the dielectric layer includes a plurality of dielectric grains, at least one of the plurality of dielectric grains includes a dielectric composite in which a barium titanate-based compound is doped with hafnium (Hf) or a first transition metal; and a subcomponent including a rare earth element, a second transition metal, or a combination thereof, among results from the TEM-EDS (transmission electron microscopy-energy dispersive spectroscopy) line analysis of the dielectric grains from a center of the dielectric grains to either grain boundary, a first point having a maximum atomic % value of hafnium (Hf) or the first transition metal is different from a location of a second point having a maximum atomic % value of the rare earth element or the second transition metal, the first transition metal excludes hafnium (Hf), and the first transition metal and the second transition metal are different from each other.

The dielectric composite powder in which the barium titanate-based compound is doped with hafnium (Hf) or the first transition metal (TM) may include a core portion including the barium titanate-based compound and a shell portion surrounding at least a portion of the core portion and including $Ba(Ti, Hf)O_3$ or $Ba(Ti, TM)O_3$.

The dielectric composite powder may be prepared by preparing a barium titanate seed including barium (Ba) and titanium (Ti) by hydrothermal synthesis; and mixing the barium titanate seed with a hafnium (Hf)-containing compound or a first transition metal-containing compound.

The hafnium (Hf)-containing compound or the first transition metal-containing compound may be mixed in an amount of about 0.1 parts by mole to about 3 parts by mole based on 100 parts by mole of titanium (Ti).

The first transition metal-containing compound may include at least one selected from the group consisting of a zirconium (Zr)-containing compound, a yttrium (Y)-containing compound, a tantalum (Ta)-containing compound, a niobium (Nb)-containing compound, and combinations thereof.

The subcomponent powder may include a rare earth element-containing compound, a second transition metal-containing compound, or a combination thereof.

The rare earth element-containing compound may include at least one selected from the group consisting of a dysprosium (Dy)-containing compound, a terbium (Tb)-containing compound, a yttrium (Y)-containing compound, a lanthanum (La)-containing compound, a cerium (Ce)-containing compound, a samarium (Sm)-containing compound, a gadolinium (Gd)-containing compound, a holmium (Ho)-containing compound, an erbium (Er)-containing compound, and combinations thereof.

The second transition metal-containing compound may include a manganese (Mn)-containing compound, a vanadium (V)-containing compound, or a combination thereof.

A multilayer ceramic capacitor according to some embodiments of the present disclosure may improve DC-bias characteristics and reliability.

BRIEF DESCRIPTION OF THE DRAWINGS

FIG. 6 is a TEM-EDS (transmission electron microscope-energy dispersive spectroscopy) line analysis diagram of the dielectric grains according to Example 1.

FIG. 7 is a TEM-EDS (transmission electron microscope-energy dispersive spectroscopy) analysis image of the dielectric layer according to Example 1.

DETAILED DESCRIPTION OF THE EMBODIMENTS

Figure 1:
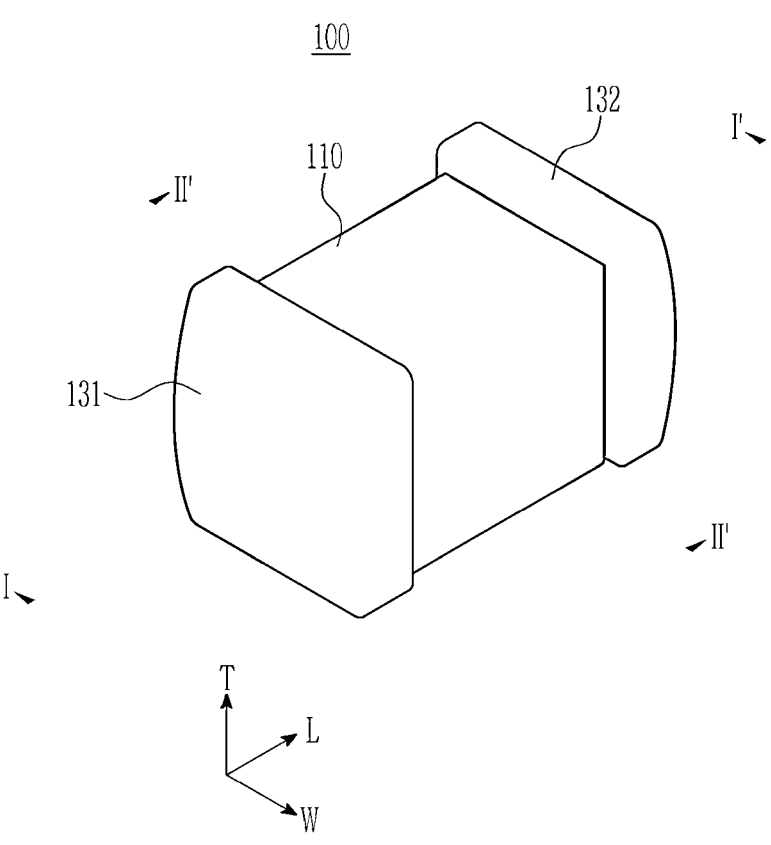
FIG. 1 is a perspective view showing a multilayer ceramic capacitor according to an embodiment.

Hereinafter, the present disclosure will be described in detail hereinafter with reference to the accompanying drawings, in which embodiments of the present disclosure are shown. The drawings and description are to be regarded as illustrative in nature and not restrictive. Like reference numerals designate like elements throughout the specification. In the accompanying drawings, some components are exaggerated, omitted, or schematically illustrated, and the size of each component does not entirely reflect the actual size.

The accompanying drawings are intended only to facilitate an understanding of the embodiments disclosed in this specification, and it is to be understood that the technical ideas disclosed herein are not limited by the accompanying drawings and include all modifications, equivalents, or substitutions that are within the range of the ideas and technology of the present disclosure.

Although terms of "first," "second," and the like are used to explain various components, the components are not limited to such terms. These terms are only used to distinguish one component from another component.

In addition, it will be understood that when an element such as a layer, film, region, or substrate is referred to as being "on" another element, it can be directly on the other element or intervening elements may also be present. In contrast, when an element is referred to as being "directly on" another element, there are no intervening elements present. Further, when an element is referred to as being "on" or "above" a reference element, it can be positioned above or below the reference element, and it is not necessarily referred to as being positioned "on" or "above" in a direction opposite to gravity.

Throughout the specification, the terms "comprise" or "have" are intended to specify the presence of stated features, integers, steps, operations, components, components or a combination thereof, but do not preclude the presence or addition of one or more other features, integers, steps, operations, components, components, and/or groups thereof. Therefore, unless explicitly described to the contrary, the word "comprise" and variations such as "comprises" or "comprising" will be understood to imply the inclusion of stated elements but not the exclusion of any other elements.

Further, throughout the specification, the phrase "in a plan view" or "on a plane" means viewing a target portion from the top, and the phrase "in a cross-sectional view" or "on a cross-section" means viewing a cross-section formed by vertically cutting a target portion from the side.

Throughout the specification, the term "connected" does not mean only that two or more constituent components are directly connected, but may also mean that two or more constituent components are indirectly connected through another constituent component, that two or more components are electrically connected as well as physically connected, or that two or more constituent components are referred to by different names but are united by location or function.

Hereinafter, a multilayer ceramic capacitor according to an embodiment will be described with reference to FIG. 1 to FIG. 3.

Figure 2:
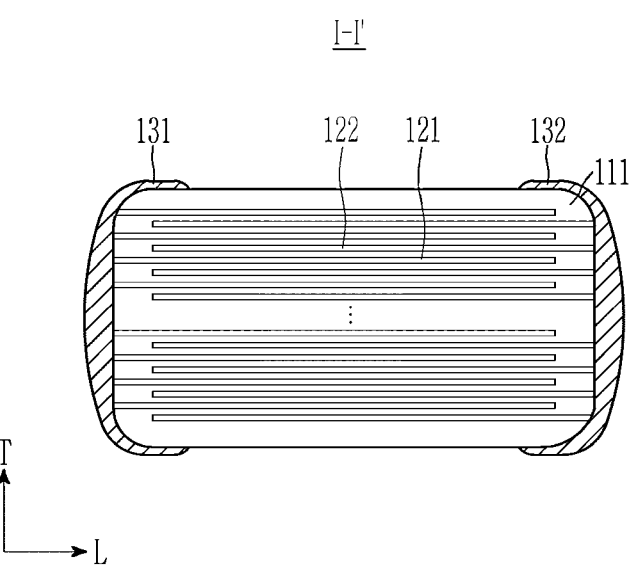
FIG. 2 is a cross-sectional view of a multilayer ceramic capacitor taken along line I-I' of FIG. 1.
Figure 3:
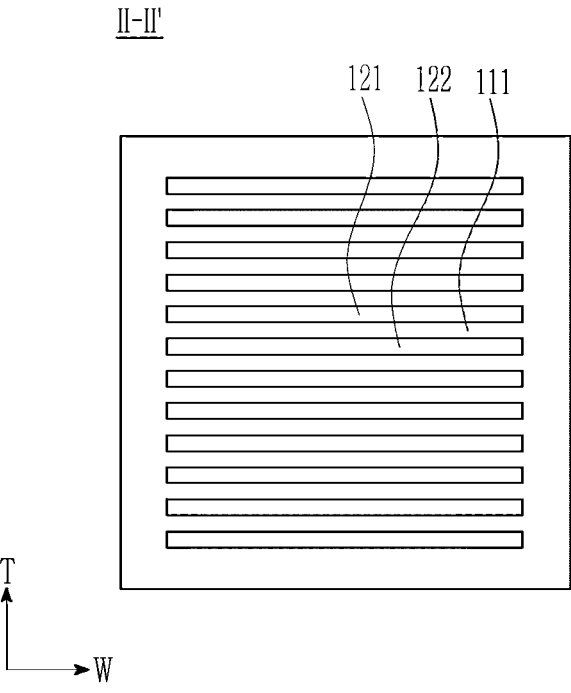
FIG. 3 is a cross-sectional view of the multilayer ceramic capacitor taken along line II-II' in FIG. 1.

FIG. 1 is a perspective view showing a multilayer ceramic capacitor according to an embodiment, FIG. 2 is a cross-sectional view of a multilayer ceramic capacitor taken along line I-I' of FIG. 1, and FIG. 3 is a cross-sectional view of a multilayer ceramic capacitor taken along line II-II' of FIG. 1.

The L-axis, W-axis, and T-axis shown in FIG. 1 to FIG. 3 represent a length direction, a width direction, and a thickness direction of a capacitor body 110, respectively. Here, the thickness direction (T-axis direction) may be a direction perpendicular to the wide surface (major surface) of the sheet-shaped components, and may be used as the same concept as a stacking direction in which a dielectric layer 111 are stacked, for example. The length direction (L-axis direction) may be a direction extending parallel to the wide surface (major surface) of the sheet-shaped components, and may be approximately perpendicular to the thickness direction (T-axis direction). For example, the length direction (L-axis direction) may be the direction in which an external electrode 131 and a second external electrode 132 are positioned. The width direction (W-axis direction) may be a direction extending parallel to the wide surface (major surface) of the sheet-shaped components, and may be approximately perpendicular to the thickness direction (T-axis direction) and the length direction (L-axis direction). The length of the sheet-shaped components in the length direction (L-axis direction) may be longer than the length in the width direction (W-axis direction).

Referring to FIG. 1 to FIG. 3, a multilayer ceramic capacitor 100 according to an embodiment includes the capacitor body 110 and external electrodes 131 and 132 disposed on an outer surface of the capacitor body 110. The external electrodes may include a first external electrode 131 and a second external electrode 132 disposed at opposite ends of the capacitor body 110 in the length direction (L-axis direction).

For example, the capacitor body 110 may have a roughly hexahedral shape.

For convenience of description of an embodiment, the two surfaces opposing each other in the thickness direction (T-axis direction) of the capacitor body 110 are referred to as first and second surfaces, the two surfaces connected to the first and second surfaces and opposing each other in the length direction (L-axis direction) are referred to as third and the fourth surfaces, and two surfaces connected to the first and second surfaces and to the third and fourth surfaces, and opposing each other in the width direction (W-axis direction) are referred to as the fifth and sixth surfaces.

According to some embodiments of the present disclosure, the first surface, which is the lower surface, may be a surface facing the mounting direction. Additionally, the first to the sixth surfaces may be flat, but the embodiment is not limited thereto. For example, the first to the sixth surfaces may be curved surfaces with a convex central portion, and the edges, which are the boundaries of each surface, may be rounded.

The shape and size of the capacitor body 110 and the number of stacks of the dielectric layers 111 are not limited to those shown in the drawings of the embodiment.

The capacitor body 110 includes a plurality of dielectric layers 111 and internal electrode layers 121 and 122. Specifically, the capacitor body 110 includes the plurality of dielectric layers 111 and a first internal electrode 121 and a second internal electrode 122 alternately disposed in the thickness direction (T-axis direction) interposing the dielectric layer 111.

At this time, the boundaries between adjacent dielectric layers 111 of the capacitor body 110 may be integrated to the extent that it is difficult to check without using a scanning electron microscope (SEM).

The capacitor body 110 may have the active region. The active region is a region where the dielectric layer 111 and the internal electrode layers 121 and 122 are alternately disposed, which contributes to forming capacity of the multilayer ceramic capacitor 100. Specifically, the active region may be a region where the first internal electrode 121 or the second internal electrode 122 stacked along the thickness direction (T-axis direction) overlap.

In addition, the capacitor body 110 may further include a cover portion and a side marginal portion.

The cover region is a thickness direction marginal portion, and may be positioned on the first and second surfaces of the active region in the thickness direction (T-axis direction), respectively. This cover portion may be a single dielectric layer 111 or two or more dielectric layers 111 stacked on the upper and lower surfaces of the active region, respectively.

The side marginal portion may be considered as a side cover portion, and may be located at each of both ends of the active region facing each other in the width direction (the W-axis direction), i.e, to the fifth surface and the sixth surface. The side margin region may be formed according as, when the conductive paste layer for the internal electrode layer is applies on a surface of a dielectric green sheet, the dielectric green sheets, which are applied with the conductive paste layer only in a partial region of the surface of the dielectric green sheet and not applied with the conductive paste layer on both side surfaces of the surface of the dielectric green sheet, are stacked and then fired, but the forming method is not limited thereto.

The cover region and the side marginal portion serve to prevent damage to the first internal electrode 121 and the second internal electrode 122 due to physical or chemical stress.

The dielectric layer 111 may include a plurality of dielectric grains.

At least one of the plurality of dielectric grains includes a dielectric composite in which a barium titanate-based compound is doped with hafnium (Hf) or a first transition metal, and a subcomponent. The first transition metal may be any transition metal except hafnium (Hf). The subcomponent includes a rare earth element, a second transition metal, or a combination thereof, and the second transition metal is different from the first transition metal.

According to some embodiments, among results from the TEM-EDS (transmission electron microscopy-energy dispersive spectroscopy) line analysis of the dielectric grains from a center of the dielectric grains to either grain boundary, a first point having a maximum atomic % value of hafnium (Hf) or the first transition metal is different from a location of a second point having a maximum atomic % value of the rare earth element or the second transition metal. That is, the first point and the second point in the dielectric grain are located at different positions. In this way, crystallinity of dielectric grains having structures in which the first and second points are at different positions may be increased by suppressing defects near the center of the dielectric grains. Accordingly, it is possible to implement fine dielectric grains, and the DC bias characteristics of the multilayer ceramic capacitor can be improved. Here, improvement in DC-bias characteristics means improvement in DC effective capacity, which means that the degree to which capacity decreases when a DC voltage is applied is reduced.

Specifically, the second point having a maximum atomic % value of the rare earth element or the second transition metal may be located further outside from a center of the dielectric grain than the first point having a maximum atomic % value of the hafnium (Hf) or the first transition metal. In this way, as the dielectric grains that have a structure in which the first point is located inside and the second point is located further outside from the center of the dielectric grain have increased crystallinity, fine dielectric grains can be implemented and the DC bias characteristics of the multilayer ceramic capacitor can be improved.

According to some embodiments, at least one of the plurality of dielectric grains may have a core-double shell structure. The dielectric grains having a core-double shell structure will be described with reference to FIG. 4.

Figure 4:
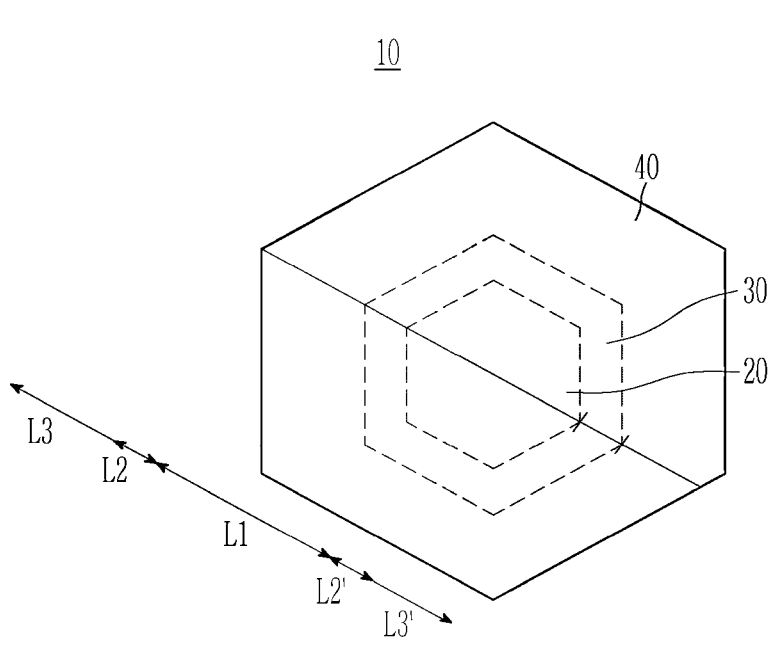
FIG. 4 is a schematic view showing dielectric grains according to an embodiment.

FIG. 4 is a schematic view showing dielectric grains according to an embodiment.

Referring to FIG. 4, the dielectric grain 10 according to some embodiments may have a core-double shell structure including a core 20, a first shell 30 surrounding at least a portion of the core 20, and a second shell 40 surrounding at least a portion of the first shell 30.

The core 20 may include a barium titanate-based compound.

The barium titanate-based compound is a dielectric base material, has a high dielectric constant, and contributes to forming the dielectric constant of the multilayer ceramic capacitor 100.

The barium titanate-based compound may include a compound including barium (Ba) and titanium (Ti), for example, include at least one selected from the group consisting of $BaTiO_3$, $Ba(Ti, Zr)O_3$, $Ba(Ti, Sn)O_3$, $(Ba, Ca)TiO_3$, $(Ba, Ca)(Ti, Ca)O_3$, $(Ba, Ca)(Ti, Zr)O_3$, $(Ba, Ca)(Ti, Sn)O_3$, $(Ba, Sr)TiO_3$, $(Ba, Sr)(Ti, Zr)O_3$, $(Ba, Sr)(Ti, Sn)O_3$, and combinations thereof.

The first shell 30 may include a barium titanate-based compound, and hafnium (Hf) or a first transition metal.

Specifically, the first shell 30 may include the dielectric composite, that is, a dielectric composite in which a barium titanate-based compound is doped with hafnium (Hf) or a first transition metal.

The first transition metal may be any transition metal except hafnium (Hf). The first transition metal may include, for example, at least one selected from the group consisting of zirconium (Zr), yttrium (Y), tantalum (Ta), niobium (Nb), and combinations thereof.

The second shell 40 may include a barium titanate-based compound as a main component and a subcomponent. The subcomponent may include a rare earth element, a second transition metal, or a combination thereof.

The rare earth element may include, for example, at least one selected from the group consisting of dysprosium (Dy), terbium (Tb), yttrium (Y), lanthanum (La), cerium (Ce), samarium (Sm), gadolinium (Gd), holmium (Ho), erbium (Er), and combinations thereof.

The second transition metal is different from the first transition metal and may include, for example, at least one selected from the group consisting of manganese (Mn), vanadium (V), and combinations thereof.

According to some embodiments, the dielectric grain 10 has a core-double shell structure, that is a structure where the first shell 30 includes a dielectric composite, that is a dielectric composite in which a barium titanate-based compound is doped with hafnium (Hf) or a first transition metal, and thereby, during firing in the manufacturing process of the capacitor body 110, the hafnium (Hf) or first transition metal present in the first shell 30 can prevent subcomponent such as the rare earth element present in the second shell 40 from diffusing into the core 20. Accordingly, defects in the core 20 are suppressed, thereby increasing the crystallinity of the core 20, and it is possible to implement fine dielectric grains, thereby improving the DC bias characteristics of the multilayer ceramic capacitor.

The core-double shell structure of the dielectric grain 10 can be confirmed through TEM-EDS (transmission electron microscopy-energy dispersive spectroscopy) line analysis. That is, among results from the TEM-EDS (transmission electron microscopy-energy dispersive spectroscopy) line analysis of the dielectric grains 10 from a center of the dielectric grains to any one of a grain boundary, the first shell 30 may be defined as a region including a peak having the maximum atomic % value of the hafnium (Hf) or the first transition metal. Additionally, the second shell 40 may be defined as a region including a peak having the maximum atomic % value of a rare earth element or a second transition metal. At this time, the first shell 30 and the second shell 40 have different regions.

Specifically, in the first shell 30, the atomic % content of hafnium (Hf) or the first transition metal may be greater than the atomic % content of the rare earth element or the second transition metal. Additionally, in the second shell 40, the atomic % content of hafnium (Hf) or the first transition metal may be smaller than the atomic % content of the rare earth element or the second transition metal.

According to some embodiments, the first shell 30 may include a dielectric composite in which a barium titanate-based compound is doped with hafnium (Hf).

Hafnium (Hf) has a high melting temperature, the ionic radius of $Hf^{4+}$ is 0.71 nm, which is larger than $Ti^{4+}$, which has an ionic radius of 0.61 nm, so that hafnium (Hf) diffuses slowly inside the barium titanate ($BaTiO_3$) itself, and it can suppress the diffusion of the subcomponents such as the rare earth element, which is an additive, into the core. Accordingly, when doping barium titanate ($BaTiO_3$) with hafnium (Hf) and applying it to the dielectric layer, diffusion of the additive into the core during firing may be suppressed and fine grain size may be obtained, thereby improving DC bias characteristics.

The dielectric composite in which the barium titanate-based compound is doped with hafnium (Hf) or the first transition metal can be used in the form of a powder having a core-shell structure when manufacturing a dielectric layer. Specifically, the core includes a barium titanate-based compound, and when the first transition metal is TM, the shell may include $Ba(Ti, Hf)O_3$ or $Ba(Ti, TM)O_3$.

In general, dielectrics with a core-shell structure are manufactured by adding the additive to barium titanate powder and then controlling the firing conditions. It is possible to form a core-shell structure by adjusting the firing conditions, but because the grain growth behavior varies depending on the firing conditions, it is difficult to form a core-shell structure while having fine grains, and additionally, some of the additive present in the shell diffuse into the core, forming defects in the core.

According to some embodiments, a dielectric is manufactured by synthesizing a dielectric composite powder having a core-shell structure in the step of synthesizing barium titanate powder. Accordingly, the dielectric layer 111 according to some embodiments may have dielectric grains 10 having a core-double shell structure manufactured by this method, thereby improving DC bias characteristics and reliability.

The core-double shell structure of the dielectric grain 10, and the components and contents present in each of the core 20, the first shell 30, and the second shell 40 may be measured using TEM-EDS (transmission electron microscopy-energy dispersive spectroscopy) analysis.

Specifically, the multilayer ceramic capacitor 100 is placed in an epoxy mixture and cured, the W-axis and T-axis direction surfaces (WT surfaces) of the capacitor body 110 are polished to a depth of ½ in the L-axis direction, and then after fixing and maintaining it in a vacuum atmosphere chamber, a cross-sectional sample can be obtained so that an active region where the dielectric layer 111 and the internal electrode layers 121 and 122 intersect can be observed. Subsequently, the active region of the cross-sectional sample can be measured using a transmission electron microscope (TEM) so that at least one layer, for example, one to five layers, of the dielectric layer 111 is visible. For example, TEM can be measured under conditions of an acceleration voltage of 200 kV using a focused ion beam (Xe-FIB) in a region of about 800 nm×800 nm where at least one layer of the dielectric layer 111 is visible in the active region. Then, in the TEM image of the measured cross-sectional sample, EDS (Energy Dispersive Spectroscopy) line analysis is performed on a straight line section from one outermost point of any dielectric grain to the other outermost point across the center. Through EDS line analysis, the core-double shell structure and the component composition present in each region can be confirmed.

Hafnium (Hf) or the first transition metal included in the first shell 30 may be doped into the barium titanate-based compound at about 0.1 atomic % to about 5 atomic %, for example, about 0.5 atomic % to about 4 atomic % based on the total amount of the dielectric composite. When the hafnium (Hf) or first transition metal is doped into a barium titanate-based compound within the above content range, diffusion of subcomponents such as rare earth elements into the core 20 during firing can be prevented, thereby increasing the crystallinity of the core. Accordingly, it is possible to implement fine dielectric grains, thereby improving the DC bias characteristics and reliability of the multilayer ceramic capacitor.

The subcomponent such as a rare earth element included in the second shell 40 may be included in an amount of about 0.1 atomic % to about 2 atomic %, for example, about 0.5 atomic % to about 1.5 atomic %, based on a total amount of components of the second shell 40. When the subcomponent is included in the second shell 40 within the above content range, a highly reliable multilayer ceramic capacitor can be secured.

Referring to FIG. 4, the length L1 of the core 20 measured on the major axis passing through the center of the dielectric grain 10 may be about 50 nm to about 150 nm, for example, about 60 nm to about 140 nm, or about 70 nm to about 130 nm.

In addition, the average lengths L2 and L2' of the first shell 30 measured on the major axis passing through the center of the dielectric grain 10 may be about 10 nm to about 50 nm, for example, about 15 nm to about 45 nm, or about 20 nm to about 40 nm. Here, L2 and L2' may be different from each other, and the average length of the first shell 30 may be an average value of L2 and L2'.

In addition, the average lengths L3 and L3' of the second shell 40 measured on the major axis passing through the center of the dielectric grain 10 may be about 40 nm to about 240 nm, for example, about 50 nm to about 230 nm, about 60 nm to about 220 nm. Here, L3 and L3' may be different from each other, and the average length of the second shell 40 may be an average value of L3 and L3'.

When the core 20, the first shell 30, and the second shell 40 each have a length within the above range, the core-double shell structure of the dielectric grain 10 is secured and the DC bias characteristics of the multilayer ceramic capacitor and reliability can be improved.

Each length of the core 20, the first shell 30, and the second shell 40 can be obtained by TEM-EDS (transmission electron microscopy-energy dispersive spectroscopy) analysis. The TEM-EDS analysis method was the same as described above.

The average diameter of the dielectric grains may be greater than or equal to about 100 nm and less than about 266 nm, for example, about 120 nm to about 250 nm. This is an average value measured for a plurality of dielectric grains, for example, 2 to 200 or 5 to 150, and the average diameter is an average value of a sum of the major axis of the dielectric grain and the axis that intersects perpendicularly thereto. When the average diameter of the dielectric grains is within the above range, the DC bias characteristics of the multilayer ceramic capacitor can be improved by having fine dielectric grains.

The average diameter of the dielectric grains can be obtained by SEM (scanning electron microscope) analysis.

Specifically, after the multilayer ceramic capacitor 100 is placed in an epoxy mixture and cured, the W-axis and T-axis direction surfaces (WT surfaces) of the capacitor body 110 are polished to a depth of ½ in the L-axis direction, and then after fixing and maintaining it in a vacuum atmosphere chamber, a cross-sectional sample can be obtained so that the active region where the dielectric layer 111 and the internal electrode layers 121 and 122 intersect can be observed. Subsequently, the active region of the cross-sectional sample can be measured using a scanning electron microscope (SEM) so that at least one layer, for example, two to five layers, of the dielectric layer 111 is visible. For example, SEM can be measured under the condition of 10 kV in the about 2.5 μm×2.5 μm region where three dielectric layers 111 are visible in the active region using the Verios G4 product from Thermofisher Scientific. From the SEM image of the cross-sectional sample, the average value of the sum of the major axis and the axis perpendicular to it can be calculated for more than 100 dielectric grains.

According to some embodiments, a number ratio of dielectric grains having the aforementioned core-dual shell structure with respect to a total amount of dielectric grains in the dielectric layers may be greater than or equal to about 50% and less than or equal to about 100%, for example, about 60% to about 100%. When the ratio of dielectric grains having a core-double shell structure is within the above range, a multilayer ceramic capacitor with improved DC bias characteristics and reliability can be obtained.

An average thickness (average length in the T-axis direction) of the dielectric layer 111 may be about 2.0 μm to about 8.0 μm, and for example, may be about 0.1 μm to about 6.0 μm. When the average thickness of the dielectric layer 111 is within the above range, the reliability of the multilayer ceramic capacitor is improved.

The average thickness of the dielectric layer 111 may be measured by a scanning electron microscope (SEM) analysis, by placing the multilayer ceramic capacitor 100 into the epoxy mixture liquid and then curing, polishing, and ion milling it. The scanning electron microscope may use, for example, a Verios G4 product from Thermofisher Scientific, the measure condition may be 10 kV, 0.2 nA, the analysis magnification may be 100 times, and the measurement may be made such that at least 1 layer or more, 3 layers or more, 5 layers or more, or 10 layers or more of the dielectric layer 111 may be obtained. In the scanning electron microscope (SEM) image, the central point of the dielectric layer 111 in the length direction (L-axis direction) or the width direction (W-axis direction) is taken as a reference point, and an arithmetic average value of the thicknesses of the dielectric layer 111 may be obtained for 10 points disposed apart from the reference point by a predetermined interval. The intervals of the 10 points may be adjusted depending on the scale of the SEM image, and may be, for example, about 1 μm to about 100 μm, about 1 μm to about 50 μm, or about 1 μm to about 10 μm. At this time, all 10 points must be positioned within the dielectric layer 111, and if all 10 points are not positioned within the dielectric layer 111, the position of the reference point may be changed, or the interval between the 10 points may be adjusted.

The first internal electrode 121 and the second internal electrode 122 are electrodes having different polarities, alternately disposed interposing the dielectric layer 111 to face each other along the T-axis direction, and may have a first end exposed through the third and fourth surfaces of the capacitor body 110, respectively.

The first internal electrode 121 and the second internal electrode 122 may be electrically insulated from each other by the dielectric layer 111 disposed in the middle.

End portions of the first internal electrode 121 and the second internal electrode 122 alternately exposed through the third and fourth surfaces of the capacitor body 110 may be electrically connected to the first external electrode 131 and the second external electrode 132, respectively.

The first internal electrode 121 and the second internal electrode 122 may include a conductive metal, for example, a metal such as Ni, Cu, Ag, Pd, Au, or an alloy thereof, such as an Ag—Pd alloy.

Additionally, the first internal electrode 121 and the second internal electrode 122 may include dielectric particles of the same composition as the ceramic material included in the dielectric layer 111.

The first internal electrode 121 and the second internal electrode 122 may be formed using a conductive paste including a conductive metal. The printing method of the conductive paste may be a screen printing method or a gravure printing method.

The average thickness of the first internal electrode 121 and the second internal electrode 122 may be about 0.1 μm to about 2 μm. The average thickness of the first internal electrode 121 and the second internal electrode 122 may be measured by the SEM analysis. Here, since the SEM analysis is the same as the method for measuring the average thickness of the dielectric layer 111 described above, a description thereof will be omitted.

The capacitor body 110 may be formed by firing a stacked structure in which the plurality of dielectric layers 111 and internal electrode layers 121 and 122 are stacked.

The first external electrode 131 and the second external electrode 132 provide voltages of different polarities, and may be electrically connected to exposed portions of the first internal electrode 121 and the second internal electrode 122, respectively.

According to the above configuration, when a predetermined voltage is applied to the first external electrode 131 and the second external electrode 132, charges are accumulated between the first internal electrode 121 and the second internal electrode 122 facing each other. At this time, the capacitance of the multilayer ceramic capacitor 100 is proportional to the overlapping area of the first internal electrode 121 and the second internal electrode 122 that overlap each other along the T-axis direction in the active region.

The first external electrode 131 and the second external electrode 132 may include, respectively, first and second connection portions disposed on the third and fourth surfaces of the capacitor body 110 and connected to the first internal electrode 121 and the second internal electrode 122, and first and second band portions disposed on edges where the third and fourth surfaces of the capacitor body 110 meet the first and second surfaces or the fifth and sixth surfaces.

The first and second band portions may extend, respectively, from the first and second connection portions to portions of the first and second surfaces of the capacitor body 110 or the fifth and sixth surfaces. The first and second band portions may serve to improve the adhesion strength of the first external electrode 131 and the second external electrode 132.

Each of the first external electrode 131 and the second external electrode 132 may include a sintered metal layer in contact with the capacitor body 110, a conductive resin layer disposed to cover the sintered metal layer, and a plating layer disposed to cover the conductive resin layer.

The sintered metal layer may include the conductive metal and glass.

The conductive metal may include at least one selected from the group consisting of copper (Cu), nickel (Ni), silver (Ag), palladium (Pd), gold (Au), platinum (Pt), tin (Sn), tungsten (W), titanium (Ti), lead (Pb), an alloy thereof, and combinations thereof, and for example, the term copper (Cu) may include a copper (Cu) alloy. When the conductive metal includes copper (Cu), metals other than copper (Cu) may be included in an amount of less than or equal to about 5 parts by mole based on 100 parts by mole of copper (Cu).

The glass may include a composition of mixed oxides, for example, one or more selected from the group consisting of silicon oxide, boron oxide, aluminum oxide, transition metal oxide, alkali metal oxide, and alkaline earth metal oxide. The transition metal may include at least one selected from the group consisting of zinc (Zn), titanium (Ti), copper (Cu), vanadium (V), manganese (Mn), iron (Fe) and nickel (Ni). The alkali metal may include at least one selected from the group consisting of lithium (Li), sodium (Na) and potassium (K), and the alkaline-earth metal may be at least one selected from a group consisting of magnesium (Mg), calcium (Ca), strontium (Sr) and barium (Ba).

Optionally, the conductive resin layer may be formed on the sintered metal layer, and for example, may be formed in the shape that completely covers the sintered metal layer. Meanwhile, the first external electrode 131 and the second external electrode 132 may not include the sintered metal layer, and in this case, the conductive resin layer may directly contact the capacitor body 110.

The conductive resin layer extends to the first and second surfaces or the fifth and sixth surfaces of the capacitor body 110, and the length of the region (i.e., band portion) where the conductive resin layer is extended and disposed to the first and second surfaces or the fifth and sixth surfaces of the capacitor body 110 may be longer than the length of the region (i.e., band portion) where the sintered metal layer is extended and disposed to the first and second surfaces or the fifth and sixth surfaces of the capacitor body 110. That is, the conductive resin layer may be formed on the sintered metal layer, and may be formed in the shape that completely covers the sintered metal layer.

The conductive resin layer may include a resin and a conductive metal.

The resin included in the conductive resin layer may be implemented by a material which has adhesive properties and shock absorption properties and is able to form a paste when mixed with the conductive metal powder, but is not limited thereto. For example, the resin may include phenolic resin, acrylic resin, silicone resin, epoxy resin, or polyimide resin.

The conductive metal included in the conductive resin layer serves to be electrically connected to the first internal electrode 121 and the second internal electrode 122 or the sintered metal layer.

The conductive metal included in the conductive resin layer may have a spherical shape, a flake shape, or a combination thereof. That is, the conductive metal may be formed only in flake shape, only in spherical shape, or in a mixed shape of flake shape and spherical shape.

Here, the spherical shape may also include a shape that is not a perfect spherical shape, for example, a shape in which the length ratio of the major axis and the minor axis (major axis/minor axis) is less than or equal to about 1.45. The flake shape powder refers to a powder with a flat and elongated shape, and is not particularly limited. But for example, the length ratio of the major axis and the minor axis (major axis/minor axis) may be greater than or equal to about 1.95.

The first external electrode 131 and the second external electrode 132 may further include a plating layer disposed on outer surface of the conductive resin layer.

The plating layer may include nickel (Ni), copper (Cu), tin (Sn), palladium (Pd), platinum (Pt), gold (Au), silver (Ag), tungsten (W), titanium (Ti), or lead (Pb), either alone or in an alloy thereof. For example, the plating layer may be a nickel (Ni) plating layer or a tin (Sn) plating layer, may be a form in which the nickel (Ni) plating layer and the tin (Sn) plating layer are sequentially stacked, or may be a form in which the tin (Sn) plating layer, the nickel (Ni) plating layer, and the tin (Sn) plating layer are sequentially stacked. In addition, the plating layer may include a plurality of the nickel (Ni) plating layers and/or a plurality of the tin (Sn) plating layers.

The plating layer may improve mountability to the substrate, structural reliability, durability to the outside, heat resistance, and equivalent series resistance (ESR) of the multilayer capacitor 100.

Hereinafter, a method of manufacturing the multilayer ceramic capacitor 100 according to an embodiment will be described.

The multilayer ceramic capacitor 100 according to some embodiments may be manufactured by preparing a dielectric composite in which a barium titanate-based compound is doped with hafnium (Hf) or a first transition metal powder; manufacturing a dielectric green sheet using a dielectric slurry including the dielectric composite powder and a subcomponent powder, and forming a conductive paste layer on the surface of the dielectric green sheet; manufacturing a dielectric green sheet stack by stacking the dielectric green sheets on which the conductive paste layer is formed; manufacturing a capacitor body including a dielectric layer and an internal electrode layer by firing the dielectric green sheet stack; and forming an external electrode on one surface of the capacitor body.

First, a dielectric composite powder in which hafnium (Hf) or a first transition metal is doped into a barium titanate-based compound is prepared.

The first transition metal may be any transition metal except hafnium (Hf), and may include, for example, at least one selected from the group consisting of zirconium (Zr), yttrium (Y), tantalum (Ta), niobium (Nb), and combinations thereof.

The dielectric composite powder will be described with reference to FIG. 5.

Figure 5:
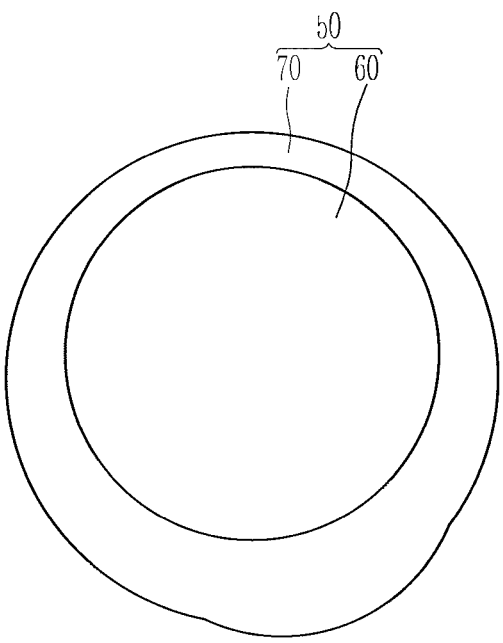
FIG. 5 is a schematic view showing a dielectric composite powder according to an embodiment.

FIG. 5 is a schematic view showing a dielectric composite powder according to an embodiment.

Referring to FIG. 5, the dielectric composite powder 50 may have a core-shell structure including a core portion 60 and a shell portion 70 surrounding at least a portion of the core portion 60. The core portion 60 may include a barium titanate-based compound, and the shell portion 70 may include $Ba(Ti, Hf)O_3$ or $Ba(Ti, TM)O_3$ when the first transition metal is TM.

The dielectric composite powder 50 may be prepared by producing barium titanate seeds including barium (Ba) and titanium (Ti) by hydrothermal synthesis, and then mixing the prepared barium titanate seed with a hafnium (Hf)-containing compound or a first transition metal-containing compound.

The temperature of hydrothermal synthesis may be greater than or equal to about 180° C., for example, about 180° C. to about 260° C. When hydrothermal synthesis is performed within the above temperature range, the core-shell structure of the dielectric composite powder can be easily formed.

The hafnium (Hf)-containing compound and the first transition metal-containing compound may be an oxide, nitride, or a salt compound, respectively, or may be used in the form of a sol dispersed in an organic solvent.

The hafnium (Hf)-containing compound or the first transition metal-containing compound may be mixed in an amount of about 0.1 parts by mole to about 3 parts by mole, for example, about 0.5 parts by mole to about 2.5 parts by mole, based on 100 parts by mole of titanium (Ti). When the hafnium (Hf)-containing compound or the first transition metal-containing compound is included within the above content range, the barium titanate-based compound may be doped at an appropriate level, thereby preventing the subcomponent such as the rare earth element, which is an additive, from diffusing into the core 20. Accordingly, the crystallinity of the core 20 increases, and fine dielectric grains can be realized, making it possible to manufacture a multilayer ceramic capacitor with excellent DC bias characteristics and reliability.

Next, a dielectric slurry is prepared by mixing the prepared dielectric composite powder and a subcomponent powder.

The subcomponent powder may include a rare earth element-containing compound, a second transition metal-containing compound, or a combination thereof.

The rare earth element-containing compound may include at least one selected from the group consisting of a dysprosium (Dy)-containing compound, a terbium (Tb)-containing compound, a yttrium (Y)-containing compound, a lanthanum (La)-containing compound, a cerium (Ce)-containing compound, a samarium (Sm)-containing compound, a gadolinium (Gd)-containing compound, a holmium (Ho)-containing compound, an erbium (Er)-containing compound, and combinations thereof.

The second transition metal-containing compound may include at least one selected from the group consisting of a manganese (Mn)-containing compound, a vanadium (V)-containing compound, and combinations thereof.

When the additive such as a rare earth element-containing compound is added to the aforementioned dielectric composite powder, hafnium (Hf), which already occupies the lattice in the preparation stage of the dielectric composite powder, does not diffuse and forms a first shell, and then, a second shell made of the additive such as the rare earth element may be formed. Accordingly, hafnium (Hf) suppresses the diffusion of the additive such as the rare earth element into the core, thereby reducing defects in the core.

The subcomponent powder may be included in an amount of about 0.01 parts by mole to about 5 parts by mole, for example, about 0.1 parts by mole to about 4 parts by mole based on 100 parts by mole of titanium (Ti). When the subcomponent powder is included within the above content range, a highly reliable multilayer ceramic capacitor can be manufactured.

For example, the rare earth element-containing compound may include a dysprosium (Dy)-containing compound. The dysprosium (Dy)-containing compound may be included in an amount of about 0.5 parts by mole to about 1.5 parts by mole, for example, about 0.7 parts by mole to about 1.3 parts by mole, based on 100 parts by mole of titanium (Ti). When the dysprosium (Dy)-containing compound is included within the above content range, a highly reliable multilayer ceramic capacitor can be manufactured.

The dielectric slurry may be prepared by additionally mixing a solvent and an additive, such as a dispersant, a binder, a plasticizer, a lubricant, or an antistatic agent.

The dispersant may include, for example, a phosphoric acid ester-based dispersant, a polycarboxylic acid-based dispersant, or a combination thereof. The dispersant may be mixed at about 0.1 part by weight to about 5 parts by weight, and for example, may be mixed at about 0.3 parts by weight to about 3 parts by weight based on 100 parts by weight of the barium titanite-based compound When the dispersant is mixed within the above content range, the dielectric slurry may show excellent dispersibility, and the amount of impurities included in the manufactured dielectric layer may be reduced.

The binder may be, for example, an acrylic resin, a polyvinyl butyl resin, a polyvinyl acetal resin, an ethylcellulose resin, or the like. The binder may be added at 0.1 part by weight to 50 parts by weight, for example, at 3 parts by weight to 30 parts by weight, based on 100 parts by weight of the barium titanite-based compound. When the binder is mixed within the above content range, the dielectric slurry shows excellent dispersibility, and the amount of impurities included in the manufactured dielectric layer may be reduced.

The plasticizer may be, for example, a phthalic acid-based compound such as dioctyl phthalate, benzyl butyl phthalate, dibutyl phthalate, dihexyl phthalate, di(2-ethylhexyl) phthalate, and di(2-ethylbutyl) phthalate; an adipic acid-based compound such as dihexyl adipate and di(2-ethylhexyl) adipate; a glycol-based compound such as ethylene glycol, diethylene glycol, and triethylene glycol; a glycol ester-based compound such as triethylene glycol dibutyrate, triethylene glycol di(2-ethylbutyrate), and triethylene glycol di(2-ethylhexanoate); and the like. The plasticizer may be added in an amount of about 0.1 part by weight to about 20 parts by weight, for example, about 1 part by weight to about 10 parts by weight, based on 100 parts by weight of the barium titanite-based compound. When the plasticizer is mixed within the above content range, the dielectric slurry may show excellent dispersibility, and the amount of impurities included in the manufactured dielectric layer may be reduced.

The solvent may be an aqueous solvent such as water; an alcohol-based solvent such as ethanol, methanol, benzyl alcohol, and methoxyethanol; a glycol-based solvent such as ethylene glycol and diethylene glycol; a ketone-based solvent such as acetone, methyl ethyl ketone, methyl isobutyl ketone, and cyclohexanone; an ester-based solvent such as butyl acetate, ethyl acetate, carbitol acetate, and butylcarbitol acetate; an ether-based solvent such as methyl Cellosolve™, ethyl Cellosolve™, butyl ether, and tetrahydrofuran; an aromatic-based solvent such as benzene, toluene, and xylene, or the like. The solvent may be, for example, an alcohol-based solvent or aromatic-based solvent, considering dissolubility or dispersibility of various additives included in the dielectric slurry. The solvent may be mixed in an amount of about 50 parts by weight to about 1000 parts by weight, or for example, about 100 parts by weight to about 500 parts by weight based on 100 parts by weight of the barium titanite-based compound. When the solvent is mixed within the above content range, the dielectric slurry components may be sufficiently mixed, and subsequent removal of the solvent is easy.

The aforementioned dielectric slurry may be mixed by using a wet ball mill or a stirred mill. When using the zirconia balls in the wet ball mill, a plurality of zirconia balls with a diameter of about 0.1 mm to about 10 mm may be used for wet mixing for about 8 hours to about 48 hours, or about 10 hours to about 24 hours.

The prepared dielectric slurry is formed into a dielectric layer after firing.

As a method of molding the prepared the dielectric slurry into a sheet shape, a tape molding method such as a doctor blade method, a calender roll method, etc. may be used, for example, an on-roll molding coater with a head discharge method, and a dielectric green sheet may be obtained by drying the molded body afterward.

In order to form the conductive paste layer that becomes the internal electrode layer after firing, a conductive paste may be prepared by mixing a conductive powder made of a conductive metal or an alloy thereof, a binder, and a solvent. Additionally, barium titanate powder may be mixed together as a co-material if necessary. The co-material may act to suppress sintering of the conductive powder during the firing process. The conductive paste layer is formed by applying a conductive paste to the surface of the dielectric green sheet in a predetermined pattern using various printing methods such as screen printing or transfer methods.

The conductive powder may include nickel (Ni) or a nickel (Ni) alloy.

Next, a dielectric green sheet stack is prepared by stacking a plurality of layers of dielectric green sheets on which internal electrode patterns are formed, and then pressing the plurality of layers of dielectric green sheets in the stacking direction. At this time, the dielectric green sheet and the internal electrode pattern may be stacked so that the dielectric green sheet is positioned on the upper and lower surfaces of the dielectric green sheet stack in the stacking direction.

The step of cutting the prepared dielectric green sheet stack to a predetermined size by dicing or the like may optionally be performed.

Additionally, the dielectric green sheet stack may be solidified and dried to remove plasticizers, etc., if necessary, and after solidified and dried, the dielectric green sheet stack may be barrel polished using a horizontal centrifugal barrel machine, and the like. In barrel polishing, the dielectric green sheet stack is placed into a barrel container with media and polishing liquid, and rotational motion or vibration is applied to the barrel container, thus unnecessary parts, such as burrs generated during cutting, may be polished. Additionally, after barrel polishing, the dielectric green sheet stack may be washed with a cleaning solution such as water, and dried.

Subsequently, the capacitor body may be prepared after binder removal treatment and firing of the dielectric green sheet stack.

The conditions for binder removal may be appropriately adjusted depending on the components of the dielectric layer or the internal electrode layer. For example, a temperature increase rate during binder removal treatment may be about 5° C./hour to about 300° C./hour, the support temperature may be 180° C. to 400° C., and the temperature holding time may be 0.5 hour to 24 hours. The binder removal may be performed under an air atmosphere or a reducing atmosphere.

The conditions of the firing treatment may be appropriately adjusted depending on the primary component composition of the dielectric layer or the primary component composition of the internal electrode. For example, firing may be performed at a temperature of about 1100° C. to about 1400° C., and may be performed at a temperature of about 1200° C. to about 1350° C. Additionally, firing may be performed for about 0.5 to about 8 hours, for example, about 1 to about 3 hours. Additionally, the firing may be performed in a reducing atmosphere, for example, in a humidified mixed gas of nitrogen and hydrogen. When the internal electrode includes nickel (Ni) or a nickel (Ni) alloy, an oxygen partial pressure under the firing atmosphere may be about $1.0 \times 10^{-14}$ MPa to about $1.0 \times 10^{-10}$ MPa.

After firing, annealing may be performed as needed. The annealing is a treatment to re-oxidize the dielectric layer, and annealing may be performed if firing is performed in a reducing atmosphere. The conditions of the annealing treatment may also be appropriately adjusted depending on the components of the dielectric layer. For example, the annealing temperature may be about 950° C. to about 1150° C., the time may be about 0 to about 20 hours, and the temperature increase rate may be about 50° C./hour to about 500° C./hour. The annealing atmosphere may be a humidified nitrogen gas ($N_2$) atmosphere, and an oxygen partial pressure may be about $1.0 \times 10^{-9}$ MPa to about $1.0 \times 10^{-5}$ MPa.

In binder removal treatment, firing treatment, or annealing treatment, for example, a wetter may be used to humidify nitrogen gas or mixed gas. In this case, the water temperature may be about 5° C. to about 75° C. The binder removal treatment, firing treatment, and annealing treatment may be performed sequentially or independently.

Optionally, surface treatment such as sand blasting, laser irradiation, barrel polishing, etc. may be performed on the third and fourth surfaces of the prepare capacitor body 110. By performing this surface treatment, the ends of the first internal electrode and the second internal electrode may be exposed to the outermost surfaces of the third and fourth surfaces, and thus the electrical connection between the first external electrode and the second external electrode, and the first internal electrode and the second internal electrode may be improved, alloy portions may be easily formed.

Subsequently, the external electrode is formed on the first surface of the manufactured capacitor body 110.

According to some embodiments of the present disclosure, a paste for forming the sintered metal layer may be applied to the external electrode and then sintered to form the sintered metal layer.

The paste for forming the sintered metal layer may include the conductive metal and glass. Since the description of the conductive metal and glass is the same as described above, repetitive description will be omitted. Additionally, the paste for forming the conductive resin layer may optionally include a binder, a solvent, a dispersant, a plasticizer, an oxide powder, and the like. The binder may be, for example, ethyl cellulose, acrylate, butyral, etc., and the solvent may be, for example, an organic solvent or aqueous solvent such as terpineol, butyl carbitol, alcohol, methyl ethyl ketone, acetone, toluene, and the like.

Methods for applying the paste for forming the sintered metal layer on the outer surface of the capacitor body 110 may include various printing methods such as dip method and screen printing, application method using a dispenser, etc., and spraying method using spray. The paste for forming the sintered metal layer may be applied to at least the third and fourth surfaces of the capacitor body 110, and optionally applied to a part of the first, second, fifth, or the sixth surfaces on which the band portions of the first and second external electrodes are formed.

Thereafter, the capacitor body 110 applied with the paste for forming the sintered metal layer is dried, and sintered at a temperature of about 700° C. to about 1000° C. for about 0.1 hour to about 3 hours, to form the sintered metal layer.

Optionally, a paste for forming the conductive resin layer is applied on an outer surface of the obtained capacitor body 110 and then cured, to form the conductive resin layer.

The paste for forming the conductive resin layer may include a resin and, optionally, a conductive metal or a non-conductive filler. Since the description of the conductive metal and resin is the same as described above, repetitive description will be omitted. Additionally, the paste for forming the conductive resin layer may optionally include a binder, a solvent, a dispersant, a plasticizer, an oxide powder, and the like. The binder may be, for example, ethyl cellulose, acrylate, butyral, etc., and the solvent may be an organic solvent or aqueous solvent such as terpineol, butyl carbitol, alcohol, methyl ethyl ketone, acetone, and toluene.

For example, the conductive resin layer may be formed by dipping the capacitor body 110 in the paste for forming the conductive resin layer and then curing it, or by printing the paste for forming the conductive resin layer on the surface of the capacitor body 110 by a screen printing method or a gravure printing method, or by applying the paste for forming the conductive resin layer to the surface of the capacitor body 110 and then curing it.

Next, the plating layer is formed on the outside of the conductive resin layer.

For example, the plating layer may be formed by a plating method, sputtering, or electrolytic plating (electric deposition).

Hereinafter, the embodiments are illustrated in more detail with reference to examples. However, these examples are exemplary, and the scope of claims is not limited thereto.

Manufacturing of Multilayer Ceramic Capacitor

Example 1

Barium titanate ($BaTiO_3$) seeds were prepared by hydrothermal synthesis of titanium dioxide ($TiO_2$) peptized sol and barium hydroxide ($BaOH$) at 260° C., and then the barium titanate ($BaTiO_3$) seeds were mixed with hafnium oxide ($HfO_2$), to prepare Hf-doped $BaTiO_3$ powders, that is, dielectric composite powders.

The dielectric composite powders were prepared with a core-shell structure made of a $BaTiO_3$ core and a $Ba(Ti, Hf)O_3$ shell. At this time, hafnium oxide ($HfO_2$) was mixed at 1 part by mole per 100 parts by mole of titanium (Ti).

The prepared dielectric composite powder and subcomponent powders of dysprosium oxide ($Dy_2O_3$), manganese oxide (MnO), and vanadium oxide ($V_2O_5$) were mixed at 1 part by mole, 0.24 parts by mole and 0.46 parts by mole, respectively, based on 100 parts by mole of titanium (Ti) to prepare a dielectric slurry.

When preparing dielectric slurry, zirconia balls ($ZrO_2$ balls) were used as a dispersion medium, ethanol/toluene and polyvinyl butyral (PVB) resin were added as a wetting dispersant and a binder, and then mixed by mechanical milling.

A dielectric green sheet was manufactured using the prepared dielectric slurry using a head discharge type on-roll forming coater.

A conductive paste layer including nickel (Ni) is printed on the surface of the dielectric green sheet, and the dielectric green sheet (width×depth×height=3.2 mm×2.5 mm×2.5 mm) on which the conductive paste layer is stacked and squeezed, to manufacture a dielectric green sheet stack.

The dielectric green sheet stack was subjected to a plasticizing process at 400° C. or lower in a nitrogen atmosphere, and then fired at a firing temperature of 1300° C. or lower and a hydrogen concentration of 1.0% $H_2$ or lower.

Subsequently, a multilayer ceramic capacitor is manufactured through processes of an external electrode, plating, or the like.

Comparative Example 1

A multilayer ceramic capacitor was manufactured in the same manner as in Example 1, except that barium titanate ($BaTiO_3$) as a main ingredient powder prepared by mixing $BaCO_3$ powder and $TiO_2$ powder, and dysprosium oxide ($Dy_2O_3$), manganese oxide (MnO), and vanadium oxide ($V_2O_5$) as a subcomponent powder at 1 part by mole, 0.24 parts by mole, and 0.46 parts by mole, respectively based on 100 parts by mole of titanium (Ti) to prepare a dielectric slurry.

Evaluation 1: TEM-EDS Analysis

Figure 6:
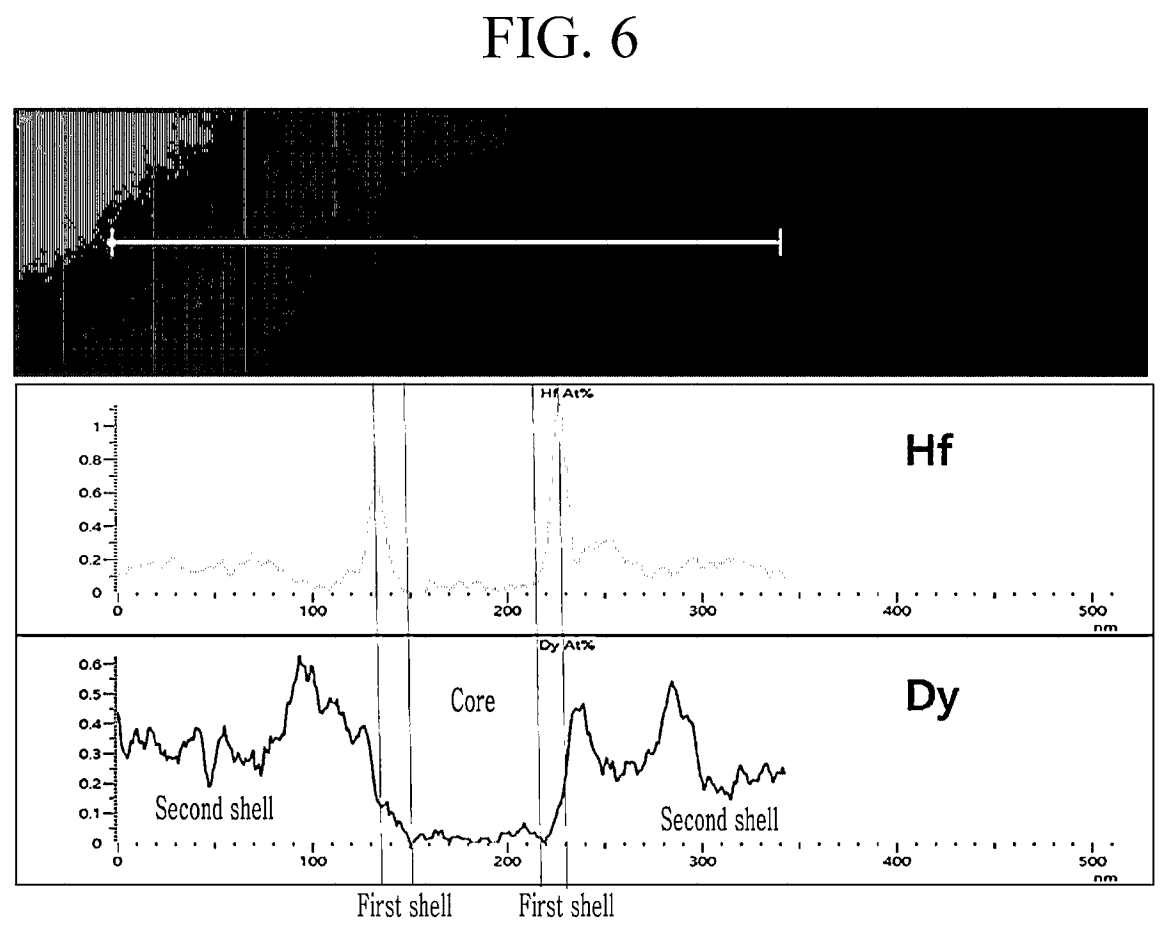
Figure 7:
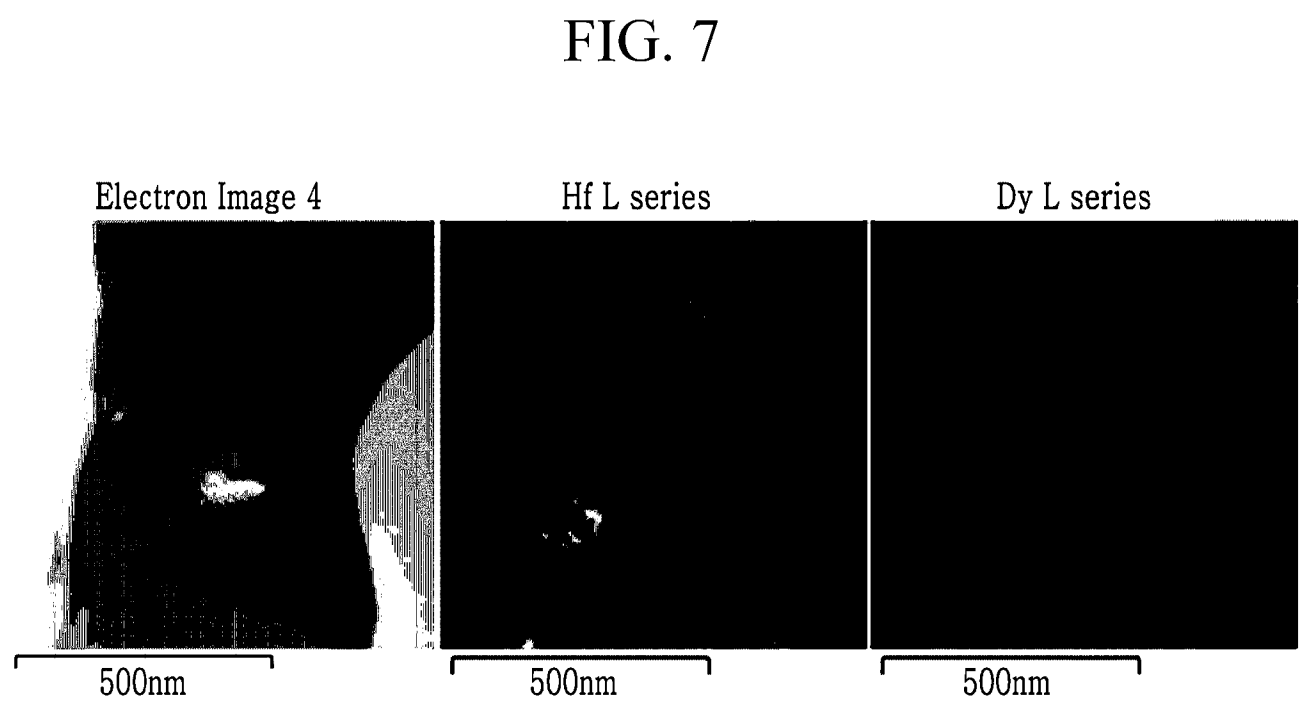

TEM-EDS (transmission electron microscopy-energy dispersive spectroscopy) analysis was performed on the multilayer ceramic capacitor manufactured in Example 1, and the results are shown in FIGS. 6 and 7.

Specifically, the multilayer ceramic capacitor manufactured in Example 1 was placed in an epoxy mixture and cured, then the W-axis and T-axis direction surfaces (WT surfaces) of the capacitor body were polished to a depth of ½ in the L-axis direction, and then after fixing and maintaining it in a vacuum atmosphere chamber, a cross-sectional sample was obtained so that the active region where the dielectric layer and the internal electrode layers intersect can be observed. Subsequently, the active region of the cross-sectional sample was measured using a transmission electron microscope (TEM) to ensure that at least one dielectric layer was visible. TEM was measured in a region of about 800 nm×800 nm where at least one layer of the dielectric layer 111 may be seen in the active region by using focused ion beam (Xe-FIB) under the condition of acceleration voltage of 200 kV. Then, in the TEM image of the measured cross-sectional sample, EDS (Energy Dispersive Spectroscopy) line analysis was performed on a straight line section from one outermost point of any dielectric grain to the other outermost point across the center to confirm the structure and component content of dielectric grains.

FIG. 6 is a TEM-EDS (transmission electron microscope-energy dispersive spectroscopy) line analysis diagram of the dielectric grains according to Example 1 and FIG. 7 is a TEM-EDS (transmission electron microscope-energy dispersive spectroscopy) analysis image of the dielectric layer according to Example 1.

Referring to FIG. 6, among results from the TEM-EDS (transmission electron microscopy-energy dispersive spectroscopy) line analysis of the dielectric grains from a center of the dielectric grains to either grain boundary, a first point having a maximum atomic % value of hafnium (Hf) is different from a location of a second point having a maximum atomic % value of dysprosium (Dy), and the second point having the maximum atomic % value of dysprosium (Dy) is located further outside from the center of the dielectric grain than the first point having the maximum atomic % value of hafnium (Hf). From this, it can be seen that the dielectric grains according to Example 1 have a core-double shell structure, and the first shell includes a dielectric composite in which barium titanate is doped with hafnium (Hf).

Also, referring to FIG. 7, it can be seen that the dielectric grains in the dielectric layer according to Example 1 include hafnium (Hf) in the first shell and dysprosium (Dy) in the second shell.

Evaluation 2: SEM Analysis

Figure 8:
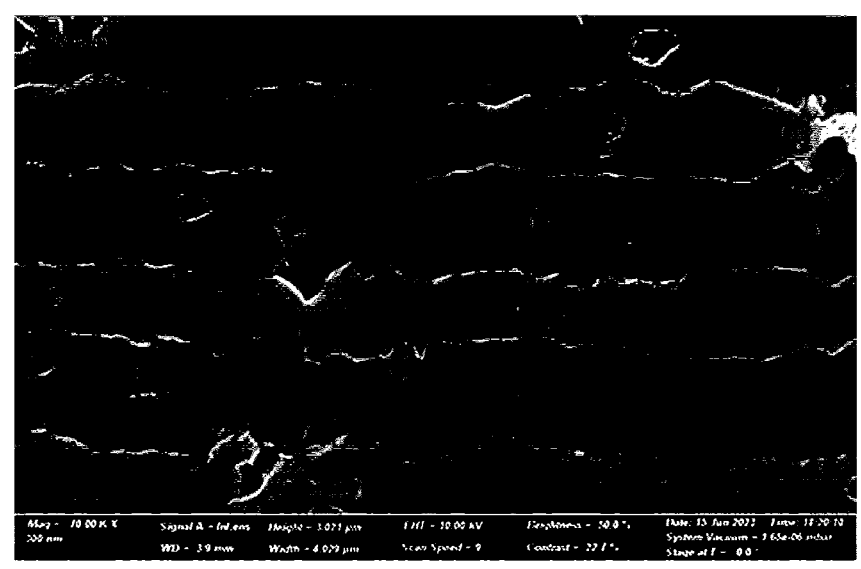
FIG. 8 is a scanning electron microscope (SEM) analysis image of the active region of the multilayer ceramic capacitor according to Example 1.
Figure 9:
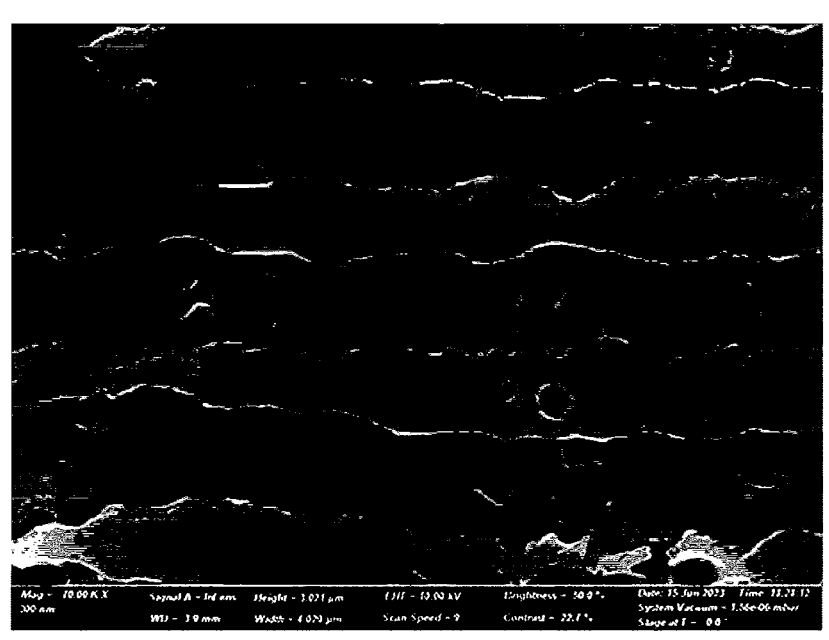
FIG. 9 is a scanning electron microscope (SEM) analysis image of the active region of the multilayer ceramic capacitor according to Comparative Example 1.

SEM (scanning electron microscope) analysis was performed on the multilayer ceramic capacitors manufactured in Example 1 and Comparative Example 1, the average diameter of dielectric grains was measured, and the results are shown in FIGS. 8 and 9.

Specifically, the multilayer ceramic capacitor was placed in an epoxy mixture and cured, then the W-axis and T-axis direction surfaces (WT surfaces) of the capacitor body were polished to a depth of ½ in the L-axis direction, and then after fixing and maintaining it in a vacuum atmosphere chamber, a cross-sectional sample was obtained so that the active region where the dielectric layer and the internal electrode layers intersect can be observed. Subsequently, the active region of the cross-sectional sample was measured using a transmission electron microscope (TEM) to ensure that three dielectric layers were visible. SEM was measured under the condition of 10 kV in the about 2.5 μm×2.5 μm region where three dielectric layers are visible in the active region using the Verios G4 product from Thermofisher Scientific. In the SEM image of the cross-sectional sample, an average value of a sum of the long axis and the axis perpendicular to it was calculated for more than 100 dielectric grains.

FIG. 8 is a scanning electron microscope (SEM) analysis image of the active region of the multilayer ceramic capacitor according to Example 1 and FIG. 9 is a scanning electron microscope (SEM) analysis image of the active region of the multilayer ceramic capacitor according to Comparative Example 1.

Referring to FIGS. 8 and 9, it can be seen that the average diameter of the dielectric grains in Example 1 is 229 nm, while the average diameter of the dielectric grains in Comparative Example 1 is 266 nm. This can be seen as the fact that hafnium (Hf), which has high thermal stability, suppresses grain growth due to heat. From this, the dielectric grains according to an embodiment, that is, the dielectric grains having a core-double shell structure and including a dielectric composite in which barium titanate is doped with hafnium (Hf) in the first shell are atomized and defects in the core are suppressed.

Evaluation 3: DC Bias Characteristics

Figure 10:
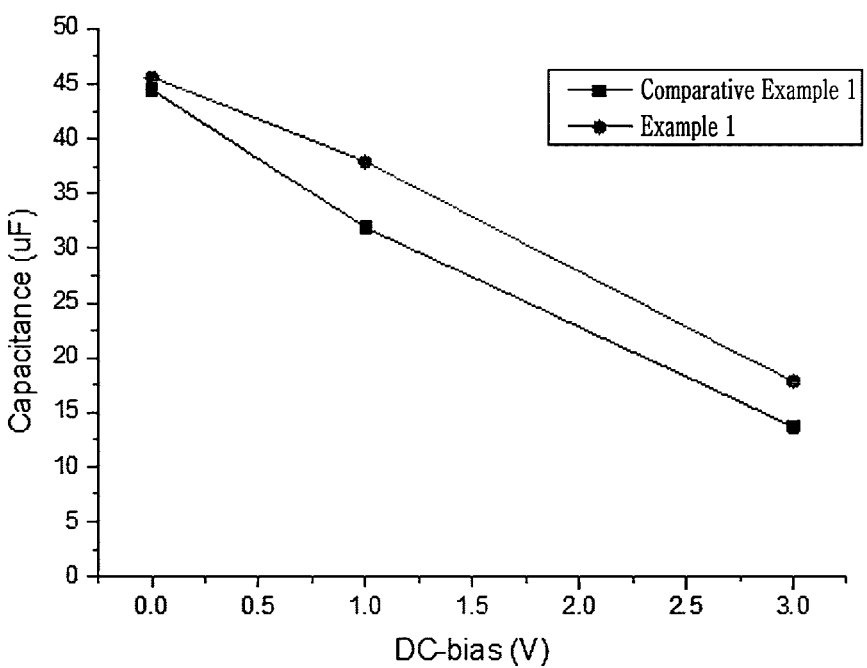
FIG. 10 is a graph showing DC bias characteristics of the multilayer ceramic capacitor according to Example 1 and Comparative Example 1.

The DC bias characteristics of the multilayer ceramic capacitors manufactured in Example 1 and Comparative Example 1 were measured by the following method, and the results are shown in FIG. 10.

The effective capacity was measured after maintaining DC bias of 1 V and 3 V for 60 seconds each under conditions of 1 khz and AC 0.5 V.

FIG. 10 is a graph showing DC bias characteristics of the multilayer ceramic capacitor according to Example 1 and Comparative Example 1.

Referring to FIG. 10, it can be seen that Example 1 has superior DC bias characteristics compared to Comparative Example 1. From this, the multilayer ceramic capacitor according to Example, that is, the multilayer ceramic capacitor having a core-double shell structure and applying dielectric grains including a dielectric composite in which barium titanate is doped with hafnium (Hf) in the first shell, has improved DC bias characteristics.

While this disclosure has been described in connection with what is presently considered to be practical embodiments, it is to be understood that the disclosure is not limited to the disclosed embodiments, but, on the contrary, is intended to cover various modifications and equivalent arrangements included within the spirit and scope of the appended claims.

DESCRIPTION OF SYMBOLS

10: dielectric grain
20: core
30: first shell
40: second shell
50: dielectric composite powder
60: core portion
70: shell portion
100: multilayer ceramic capacitor
110: capacitor body
111: dielectric layer
121: first internal electrode
122: second internal electrode
131: first external electrode
132: second external electrode

What is claimed is:

1. A multilayer ceramic capacitor, comprising
a capacitor body including a dielectric layer and an internal electrode layer, and
an external electrode disposed on an outer surface of the capacitor body,
wherein the dielectric layer includes a plurality of dielectric grains,
at least one of the plurality of dielectric grains includes:
a dielectric composite in which a barium titanate-based compound is doped with hafnium (Hf) or a first transition metal; and a subcomponent including a rare earth element, a second transition metal, or a combination thereof,
according to a TEM-EDS (transmission electron microscopy-energy dispersive spectroscopy) line analysis of the at least one of the plurality of dielectric grains from a center to a grain boundary of the at least one of the plurality of dielectric grains, a first point having a maximum atom percent (at %) of hafnium (Hf) or the first transition metal with respect to a total number of atoms of the at least one of the plurality of dielectric grains is different from a location of a second point having a maximum atom percent (at %) of the rare earth element or the second transition metal with respect to the total number of atoms of the at least one of the plurality of dielectric grains, and
the first transition metal excludes hafnium (Hf), and the first transition metal and the second transition metal are different from each other.

2. The multilayer ceramic capacitor of claim 1, wherein according to the TEM-EDS (transmission electron microscopy-energy dispersive spectroscopy) line analysis of the at least one of the plurality of dielectric grains,
the second point is located further outside from the center of the at least one of the plurality of dielectric grain than the first point.

3. The multilayer ceramic capacitor of claim 1, wherein the at least one of the plurality of dielectric grains has a core-double shell structure including a core; a first shell surrounding at least a portion of the core; and a second shell surrounding at least a portion of the first shell.

4. The multilayer ceramic capacitor of claim 3, wherein the first shell includes the dielectric composite, and the second shell includes the subcomponent.

5. The multilayer ceramic capacitor of claim 4, wherein according to the TEM-EDS (transmission electron microscopy-energy dispersive spectroscopy) line analysis,
the first shell is a region including a peak with the maximum atom percent of hafnium (Hf) or the first transition metal,
the second shell is a region including a peak with the maximum atom percent of the rare earth element or the second transition metal, and
the regions of the first shell and the second shell are different from each other.

6. The multilayer ceramic capacitor of claim 5, wherein the first shell includes a higher atom percent of hafnium (Hf) or the first transition metal than an atom percent of the rare earth element or the second transition metal, and the second shell includes a smaller atom percent of hafnium (Hf) or the first transition metal than an atom percent of the rare earth element or the second transition metal.

7. The multilayer ceramic capacitor of claim 1, wherein the first transition metal includes at least one selected from the group consisting of zirconium (Zr), yttrium (Y), tantalum (Ta), niobium (Nb), and combinations thereof.

8. The multilayer ceramic capacitor of claim 1, wherein the rare earth element includes at least one selected from the group consisting of dysprosium (Dy), terbium (Tb), yttrium (Y), lanthanum (La), cerium (Ce), samarium (Sm), gadolinium (Gd), holmium (Ho), erbium (Er), and combinations thereof.

9. The multilayer ceramic capacitor of claim 1, wherein the second transition metal includes manganese (Mn), vanadium (V), or a combination thereof.

10. The multilayer ceramic capacitor of claim 1, wherein hafnium (Hf) or the first transition metal is doped in an amount of 0.1 atomic % to 5 atomic % based on a total amount of the dielectric composite.

11. The multilayer ceramic capacitor of claim 4, wherein the subcomponent is included in an amount of 0.1 atomic % to 2 atomic % based on a total amount of components of the second shell.

12. The multilayer ceramic capacitor of claim 3, wherein a length of the core, which is measured from a major axis passing through the center of the at least one of the plurality of dielectric grains, is 50 nm to 150 nm.

13. The multilayer ceramic capacitor of claim 3, wherein an average length of the first shell, which is measured from a major axis passing through the center of the at least one of the plurality of dielectric grains, is 10 nm to 50 nm.

14. The multilayer ceramic capacitor of claim 3, wherein an average length of the second shell, which is measured from a major axis passing through the center of the at least one of the plurality of dielectric grains, is 40 nm to 240 nm.

15. The multilayer ceramic capacitor of claim 1, wherein the plurality of dielectric grains have an average diameter of greater than or equal to 100 nm and less than 266 nm.

16. The multilayer ceramic capacitor of claim 3, wherein a number ratio of the dielectric grains having the core-double shell structure among the plurality of dielectric grains is greater than or equal to 50% and less than or equal to 100%.

17. A method of manufacturing a multilayer ceramic capacitor, comprising
preparing a dielectric composite powder in which a barium titanate-based compound is doped with hafnium (Hf) or a first transition metal (TM);
manufacturing a dielectric green sheet using a dielectric slurry including the dielectric composite powder and subcomponent powder, and forming a conductive paste layer on a surface of the dielectric green sheet;
manufacturing a dielectric green sheet stack by stacking the dielectric green sheets on which the conductive paste layer is formed;
manufacturing a capacitor body including a dielectric layer and an internal electrode layer by firing the dielectric green sheet stack; and
forming an external electrode on one surface of the capacitor body,
wherein the dielectric layer includes a plurality of dielectric grains, at least one of the plurality of dielectric grains includes a dielectric composite in which a barium titanate-based compound is doped with hafnium (Hf) or a first transition metal; and a subcomponent including a rare earth element, a second transition metal, or a combination thereof, according to the TEM-EDS (transmission electron microscopy-energy dispersive spectroscopy) line analysis of the at least one of the plurality of dielectric grains from a center to a grain boundary of the at least one of the plurality of dielectric grains, a first point having a maximum atom percent (at %) of hafnium (Hf) or the first transition metal with respect to a total number of atoms of the at least one of the plurality of dielectric grains is different from a location of a second point having a maximum atom percent (at %) of the rare earth element or the second transition metal with respect to a total number of atoms of the at least one of the plurality of dielectric grains, and the first transition metal excludes hafnium (Hf), and the first transition metal and the second transition metal are different from each other.

18. The method of claim 17, wherein the dielectric composite powder includes a core portion including the barium titanate-based compound, and a shell portion surrounding at least a portion of the core portion and including $Ba(Ti, Hf)O_3$ or $Ba(Ti, TM)O_3$.

19. The method of claim 18, wherein the dielectric composite powder is prepared by preparing a barium titanate seed including barium (Ba) and titanium (Ti) by hydrothermal synthesis; and mixing the barium titanate seed with a hafnium (Hf)-containing compound or a first transition metal-containing compound.

20. The method of claim 19, wherein the hafnium (Hf)-containing compound or the first transition metal-containing compound is mixed in an amount of 0.1 parts by mole to 3 parts by mole based on 100 parts by mole of titanium (Ti).

21. The method of claim 19, wherein the first transition metal-containing compound includes at least one selected from the group consisting of a zirconium (Zr)-containing compound, a yttrium (Y)-containing compound, a tantalum (Ta)-containing compound, a niobium (Nb)-containing compound, and combinations thereof.

22. The method of claim 17, wherein the subcomponent powder includes a rare earth element-containing compound, a second transition metal-containing compound, or a combination thereof.

23. The method of claim 22, wherein the rare earth element-containing compound includes at least one selected from the group consisting of a dysprosium (Dy)-containing compound, a terbium (Tb)-containing compound, a yttrium (Y)-containing compound, a lanthanum (La)-containing compound, a cerium (Ce)-containing compound, a samarium (Sm)-containing compound, a gadolinium (Gd)-containing compound, a holmium (Ho)-containing compound, an erbium (Er)-containing compound, and combinations thereof.

24. The method of claim 22, wherein the second transition metal-containing compound includes at least one selected from the group consisting of a manganese (Mn)-containing compound, a vanadium (V)-containing compound, and combinations thereof.

\* \* \* \* \*